United States Patent Office 3,437,634
Patented Apr. 8, 1969

3,437,634
REACTIVE FERROCENE POLYMERS
Eberhard W. Neuse, Santa Monica, Calif., assignor to McDonnell Douglas Corporation, Santa Monica, Calif., a corporation of California
No Drawing. Filed June 1, 1964, Ser. No. 371,732
Int. Cl. C08g 33/20
U.S. Cl. 260—47
15 Claims

ABSTRACT OF THE DISCLOSURE

This invention is directed to novel ferrocene polymers wherein the ferrocene radicals are linked by methylene groups carrying reactive groups which are capable of reacting with crosslinking agents to form cured crosslinked polymers useful in heat-resistant and radiation-stable coatings, laminates, sealants, adhesives and potting compounds.

---

This invention relates to the preparation of ferrocene polymers, and is particularly concerned with a novel class of ferrocene polymers wherein the ferrocene radicals are linked by methylene groups carrying a functional group which is capable of reacting with crosslinking agents.

In my copending applications U.S. Ser. No. 233,913, filed Oct. 29, 1962, now Patent No. 3,238,185 entitled, "Ferrocene Polymers," and Ser. No. 308,318, filed Sept. 12, 1963, now Patent No. 3,288,083 entitled, "Ferrocene Polymers," is described the preparation of ferrocene polymers having recurring units of the type having the formula (I)

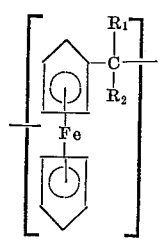

wherein $R_1$ and $R_2$ are hydrogen or alkyl, e.g., methyl, aryl, e.g., phenyl, or aralkyl groups. The polymers thus formed have the formula (II)

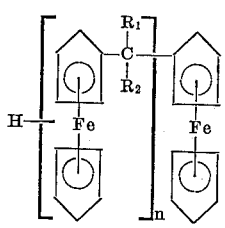

wherein $R_1$ and $R_2$ have the values noted above, and wherein $n$ is a positive integer.

Thus, according to one mode of procedure, as described in my above copending application Ser. No. 308,318, ferrocene can be condensed under appropriate conditions with formaldehyde to produce polymers of the type shown by Formula II above, wherein $R_1$ and $R_2$ are both hydrogen. This condensation proceeds essentially according to the equation set forth below.

(III)

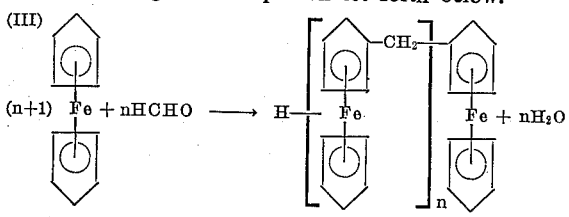

As pointed out in my copending application Ser. No. 308,318, Formula I above indicates a mixed pattern or substitution scheme on the internal ferrocenylene units of 1,2-homoannular, 1,3-homoannular, and 1,1'-heteroannular disubstitution occurring randomly along the polymer chain, as depicted by the three-segment structures I(a) below:

(Ia)

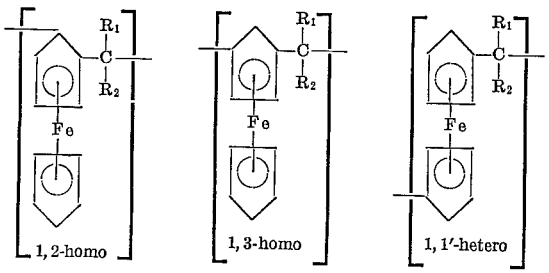

I have now developed polymeric compositions or products comprising a versatile class of ferrocene polymers of the general type illustrated by Formula II above in which the methylene bridges between adjacent ferrocene radicals carry a reactive group which is reactive with crosslinking agents to form crosslinks between different polymer chains. The ferrocene polymers of the invention which contain such reactive groups have recurring units of the type

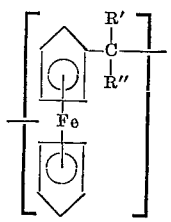

(IV)

and wherein such polymers are represented by the formula noted below:

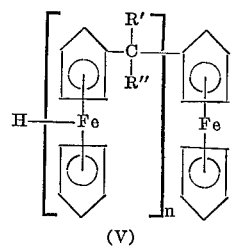

(V)

where R' is an organic radical comprising or containing a reactive group and R'' is an organic radical or hydrogen, preferably the latter, and $n$ is a positive integer. The value of $n$ can range from 1 up to 50 or more, and usually is in the range of 1 to 30. Thus, the polymers may have a low value, e.g., 2 to 4, in the case of oligomers, but the preferred polymers are of higher molecular weight and have a higher value of $n$ of the order of about 4 to about 40.

Thus, R' can include aliphatic, cycloaliphatic, aromatic, or heterocyclic organic radicals, e.g., R' can be alkyl, such as methyl, ethyl, propyl, butyl, hexyl, and the like, cycloalkyl such as cyclopentyl and cyclohexyl, alkenyl such as vinyl, propenyl, butenyl, and the like, phenyl, naphthyl, phenanthryl, aralkyl, such as benzyl, tolyl, phenylethyl, and the like, and heterocyclic, such as furyl, thienyl, pyridyl, and the like, such organic radicals containing a reactive group as described below. Although R″ also can be aliphatic, cycloaliphatic, aromatic or heterocyclic, as described above, the preferred polymers are those in which R″ is hydrogen.

The radical R′ can contain reactive groups selected from the class consisting of carboxyl, hydroxyl, cyano, alkoxy, amino, and halogen groups, and also unsaturated groups, that is those containing a double bond C=C and which undergo addition reactions, e.g., the double bond of an alkylene radical, e.g., propenyl.

In addition to primary amino groups serving as reactive groups, substituted amino groups such as tertiary amino groups, e.g., dimethyl amino, are also sufficiently reactive with crosslinking agents. Hence, the term "amino," referring to the reactive group, is intended to include both primary as well as secondary and tertiary amino which are sufficiently reactive to undergo reaction with cross-linking agents.

Also, where the functional group carried by R′ is an unsaturated double bond, crosslinking can be made to occur by extended heating of the polymer in the presence of suitable catalysts, e.g., Lewis acids such as zinc chloride, producing crosslinks between R′ groups of different ferrocene polymers by the opening of such unsaturated bonds, without requiring any additional crosslinking agent.

In certain instances the reactive group itself, for example, a hydroxyl or methoxy group, may not itself react with a crosslinking agent, but is capable of directing reaction at another position in the molecule; for example, where R′ in Formula V above is hydroxy aryl, e.g., hydroxy phenyl or hydroxy naphthyl, such hydroxyl group is capable of rendering reactive the position ortho or para to such hydroxyl group in the aryl nucleus, and thus directing crosslinking of different ferrocene polymers through adjacent aryl groups of such polymers, on which aryl groups such hydroxyl groups are positioned, so that the crosslinking radical is located in ortho or para position to such hydroxyl groups. Thus, a phenolic substituent on the methylene radical of the ferrocene polymer can effect crosslinking between different polymer chains by reaction with formaldehyde, forming a methylene bridge between aryl nuclei of the crosslinked polymers, such methylene bridge being connected in ortho or para position to the hydroxyls.

Hence, the term "reactive group" as employed herein is intended to denote and include any group which renders R′ reactive for crosslinking purposes, regardless as to whether such reactive group actually reacts with the crosslinking agent.

The reactive groups of which R′ is comprised can be the same reactive groups throughout the polymer or the polymer can contain mixed functional groups, such as hydroxy and cyano mixed groups.

In Formulae IV and V above, illustrating the ferrocene polymers of the invention, the cyclopentadienyl rings may be substituted, for example, by low molecular weight alkyl groups (e.g., methyl, ethyl, propyl, and the like) or aryl groups (e.g., phenyl, naphthyl) or aralkyl groups (e.g., benzyl and phenyl ethyl); and also by halogens (e.g., chlorine), nitro or amino groups. However, preferably, the only substituents on the cyclopentadienyl rings are the substituted methylene links between adjacent ferrocene units.

The ferrocene polymers of the invention are produced, according to the scheme of Equation III above, under the reaction conditions described hereinafter, by reacting ferrocene with an aldehyde reactant R′CHO, or by reacting ferrocene with a ketone reactant, R′COR″, where R′ and R″ have the values noted above, and in which R′ comprises a functional group such as carboxy, hydroxy, cyano, alkoxy, e.g., methoxy, ethoxy, propoxy, and the like, amino, halogen, e.g., chlorine, bromine, fluorine, and iodine, or an unsaturated group, or an otherwise activated group as described above. Examples of such aldehyde and ketone reactants include carboxybenzaldehyde, cyanobenzaldehyde, hydroxybenzaldehyde, methoxybenzaldehyde, dimethylaminobenzaldehyde, crotonaldehyde, chloral, furfural, p-methoxyacetophenone, p-hydroxyacetophenone, p-carboxy benzophenone, hexafluoroacetone and the like. Also, co-condensations can be carried out employing, for example, two or more different aldehydes, as defined above, e.g., a mixture of carboxybenzaldehyde and cyanobenzaldehyde, thus giving polymers of the Formula V above in which the substituted methylene bridges between ferrocene units carry various or different functional groups. Likewise, two or more different ketones as defined above can be co-condensed with ferrocene for the same purpose.

The ferrocene polymers of the invention carrying reactive groups as above described are useful per se as sealants, coatings, laminates, particularly to impart heat stability, and also as ultraviolet absorbers or stabilizers. Thus, these polymers can be added to phenolic resins in the A stage to produce adhesives, potting agents, and laminating agents, wherein the ferrocenyl polymers impart improved heat stability. Also, these polymers can be used as substitutes for ferrocene as catalysts in combustion reactions. A further use is as electron exchange agents by reason of the reversible reaction

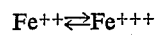

Such uncured polymers containing functional groups are also useful as stabilizers in polysiloxane fluids and elastomers.

However, the ferrocene polymers of the invention are of particular value in that because of the reactive groups carried by the methylene bridges of the polymer, such polymers can be cured or crosslinked through such reactive groups by means of di- or polyfunctional crosslinking agents which intereact with these reactive groups to form crosslinks between different ferrocene polymer chains, as illustrated below, where R′ and R″ have the values defined above, the symbol Fc represents the ferrocenyl radical, and A is the divalent crosslinking radical or the bond bridging the R′ radicals containing the reactive groups as defined above, of different ferrocene polymer chains:

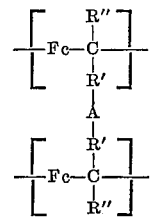

(VI)

Thus, if the polymers illustrated by general Formula V above contain carboxyl or hydroxyl groups, they can be crosslinked or cured by means of diepoxides, diisocyanates, diamines, diimines, and the like. If such polymers contain amino or imino groups, they can be cured by polycarboxylic acids such as succinic, adipic or phthalic acid. If such polymers contain halogen as functional groups, preferably on aliphatic or alkyl groups, such compounds can be cured by polyamines such as phenylene diamine or ethylene diamine. If the polymers contain methylol or hydroxyphenyl or methoxyphenyl side groups, they can be rendered curable or crosslinked with epoxides, or with A— stage phenolic resins to form ferrocene-containing phenolic condensates; if the radical R′ contains double bonds, they can be crosslinked by means of divinylbenzene, styrene, triallyl cyanurate, triallyl isocyanurate, diallyl phthalate, divinyl sulfoxide, and other compounds possessing reactive double bonds. With reactive diene structures in the group R′, for example, with R′ being 2-furyl, the polymers can be reacted with maleic anhydride or other suitable dienophiles to give polymers containing anhydride groups which, in turn, are crosslinkable by means of diepoxides.

The various cured, i.e., crosslinked polymers thus obtained are useful in heat-resistant and radiation-stable coatings, laminates, sealants, adhesives and potting compounds. The crosslinked polymers may also be advantageously utilized as electron-exchange resins. Another useful application of the cured or uncured ferrocene polymers of the invention is as dopants in the field of laser materials based on organic matrices, such as polymethyl methacrylates.

The condensations are carried out in the melt phase, using Lewis acids as catalysts, preferably weak Lewis acids such as zinc chloride. Strong Lewis acids, e.g., $AlCl_3$ or $BF_3$, may also be employed; however, occasionally side-reactions involving the functional side-groups of the carbonyl compound, i.e., aldehydic or ketonic reactant, have been observed, thus rendering strong Lewis acids less suitable. Other side-reactions frequently occurring are those in which the aldehyde or ketone enters into the reaction in excess of the stoichiometric amount required by Equation III above.

Products produced by such side reactions may contain some recurring units with more than one methylene bridge between adjacent ferrocenenyl radicals, e.g., having a structural unit such as noted below.

(VII)

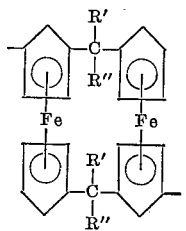

where R' and R" have the values noted above. Since this type of side-reaction can be minimized by employing an appropriate excess of ferrocene in the reaction mixture, it has been found advantageous to employ ferrocene to carbonyl reactant, i.e., aldehyde or ketone, molar reactant ratios preferably in the range of about 1 to about 4 moles of ferrocene per mole of carbonyl reactant, most desirably about 1.1 to about 2.0. However, it should be understood that employment of molar ratios other than those within the ranges indicated does not constitute a deviation from the present invention.

Advantageously, the procedure involves heating the mixture of ferrocene and aldehyde or ketone in the presence of from one to approximately 25% by weight of ferrocene, of catalyst under a nitrogen blanket at temperatures suitable for maintaining a liquid flow of the melt, i.e., usually at 100–170° C. Solubility and precipitability tests as well as "stringing" tests on the gradually resinifying and solidifying mass serve to determine the proper termination point of the reaction. If aldehydes or ketones are employed whose vapor pressures do not allow heating at the aforementioned temperature range at atmospheric pressure, the condensations are best conducted in a closed system, i.e., in a pressure vessel (autoclave or sealed tube).

The product of the above reaction generally is in the form of a mixture of polymers of low and high molecular weight wherein the value of $n$ in Formula V above can range, as previously noted, from 1 up to about 50. Selective polymer fractions having desired intermediate molecular weight ranges can be obtained by fractionation procedures as described below and in the working examples hereof. Thus, for example, high molecular weight polymer fractions wherein $n$ can range from about 20 to about 50 can be obtained by such fractionation procedures.

Upon removal of the catalyst by water extraction, the crude polymers are worked up by reprecipitation under suitable conditions, which in each case are dictated by the solubility properties of the polymer and the sensitivity and susceptibility to further reaction of the corresponding functional substituents. Removal of unreacted ferrocene is accomplished by vacuum sublimation, chromatography or selective extraction. The polymeric products thus obtained are powdery solids with number-average molecular weights, $M_n$, ranging, for example, from about 400 to about 10,000. The polymers can be cast from melt or solution to transparent films. While the lower molecular weight members obtained upon fractionation are for the most part fusible and dissolve readily in a variety of organic solvents (depending on the polarity of R' and R"), the higher molecular weight members lack defined melting ranges or are completely infusible up to 300° C., and occasionally exhibit reduced solubility.

The following examples illustrate preparation of the polymers of the present invention. All starting materials employed therein are well known compounds and are available commercially.

EXAMPLE 1

(Polycondensation of ferrocene and furfural; preparation of polymer (V) with R" being H and R' furyl)

The reaction vessel was charged with a well ground mixture of 40.0 g. (0.2150 mole) of ferrocene and 8.0 g. of anhydrous zinc chloride. To this mixture, while flushing with dry nitrogen, was added 10.34 g. (0.1075 mole) of furfural (2-furaldehyde). The vessel was preheated to 120° C. and was maintained at this temperature for 0.75 hour. During this heating period, the mixture was stirred and a steady current of dry nitrogen was passed through the system. At the onset of condensation, the mass turned black; after 20 minutes, it had homogenized without noticeably increasing in viscosity. At the point of termination, after the heating time indicated above, the melt was still liquid.

The melt was briefly chilled in a Dry Ice-acetone bath to facilitate disintegration. It was then pulverized and thoroughly extracted with warm water to remove the catalyst and unreacted aldehyde. The crude polymer, upon drying over $P_2O_5$ in vacuo, weighed 50.6 g. It was dissolved in 400 ml. of dioxane, filtered from 1.60 g. of insoluble matter, and was precipitated by slowly pouring the solution into 2,000 ml. of rapidly stirred isopropanol. The light-brown, fluffy precipitate, termed "1st fraction," was thoroughly washed with isopropanol and was dried for seven days in vacuo at 50° C. The yield was 9.37 g. (30.3%). All analytical data are summarized in line No. 1 of Table I below. The fraction showed complete solubility in such solvents as dioxane, N-methylpyrrolidone, chlorohydrocarbons, cyclohexanone and benzene; it was insoluble in aliphatic alcohols and water, and practically so in aliphatic hydrocarbons. The powdery polymer can be cast from melt or solution to form films.

From the mother-liquor remaining after separation of the 1st fraction, a second precipitate was obtained by the addition of 6 liters of water. The yellow-brown solid, essentially consisting of oligomeric condensation products and unreacted ferrocene, was collected by filtration. It was washed with 50% aqueous isopropanol and was dried for 48 hours over $P_2O_5$ to give 33.67 g. of crude product. The material was vacuum-sublimed to remove admixed ferrocene (recovered 9.92 g.). In this operation, the polymer was heated to 40° C. and, at the same time, the condenser surface was cooled to −20° C. by means of a circulating heat transfer liquid. The remaining oligomer portion was termed "2nd fraction." It weighed 21.70 g., corresponding to 44.8% yield. The analytical findings are listed in line No. 2 of Table I. The 2nd fraction, while soluble in the same solvents as the first fraction, showed increased solubility in hexane, ether and aliphatic alcohols. By fractional precipitation and chromagraphy on alumina of the lowest fraction, the dinuclear compound [(V) with R'=2-furyl, R"=H, and $n=1$] was isolated; M.P. 150–152° C.

*Analysis.*—Calculated for C, 66.71; H, 4.93; Fe, 24.81. Found: C, 66.43; H, 4.98; Fe, 24.67; $M_n$, 470.

TABLE I

| Example | Fraction | Number-average mol. wt., $M_n$ | Melting point (M.P.), °C. | Yield | Analysis calculated | | | | | Analysis found | | | | |
|---|---|---|---|---|---|---|---|---|---|---|---|---|---|---|
| | | | | | C | H | Fe | COOH | N | C | H | Fe | COOH | N |
| 1 | 1 | 2,290 | 125 | 30.3 | 67.9 | 4.7 | 21.9 | | | 67.4 | 4.9 | 20.7 | | |
| | 2 | 480 | 44.8 | 66.8 | 66.8 | 4.9 | 24.6 | | | 66.7 | 5.1 | 24.8 | | |
| 2 | 1 | 1,930 | 65 | 14.5 | 67.6 | 4.5 | 18.8 | 12.8 | | 67.1 | 5.1 | 18.0 | 12.7 | |
| | 2 | 790 | 56.3 | 67.2 | 67.2 | 4.7 | 20.5 | 10.8 | | 66.7 | 4.9 | 20.1 | 10.7 | |
| 3 | 1 | 2,310 | None | 34.7 | 71.6 | 4.5 | 19.6 | | 4.3 | 71.1 | 4.6 | 18.8 | | 4.7 |
| | 2 | 760 | 85 | 35.9 | 70.4 | 4.6 | 21.4 | | 3.6 | 70.0 | 4.5 | 21.1 | | 3.9 |

EXAMPLE 2

(Polycondensation of ferrocene and p-carboxybenzaldehyde; preparation of polymer (V) with R″ being H and R′ being 4-carboxyphenyl)

The well-ground mixture of 44.64 g. (0.240 mole) of ferrocene, 12.0 g. (0.080 mole) of p-carboxybenzaldehyde and 4.46 g. of anhydrous zinc chloride was placed in a vessel which was flushed with dry nitrogen and the vessel was heated for 45 minutes at 165° C. in an oil-bath. Throughout the reaction, a slow nitrogen stream was passed over the stirred melt. Heating was discontinued when the reaction mixture became too viscous to allow for further stirring.

From the melt, solidified on cooling, catalyst and unreacted aldehyde were removed by extraction with warm water. The remaining solid, after drying for 24 hours over $P_2O_5$ in vacuo, was extracted with pentane to remove admixed ferrocene (recovery of crude ferrocene, 23.6 g.) and was then digested with a total of 800 ml. of glacial acetic acid. In this fashion, the major portion of condensation products dissolved and could be precipitated by pouring the filtered solution into excess water. The precipitate was thoroughly washed with water and was dried for ten days, over $P_2O_5$ in a 10-micron vacuum. The dry product, a tan-colored, infusible, powdery solid weighing 18.61 g. (56.3% yield), was designated "2nd fraction." The mean $M_n$ value determined in pyridine solution is listed in line 4 of Table I, along with yield and analytical data. The fraction was readily soluble in glacial acetic acid, pyridine, dimethylformamide and cyclohexanone, was predominantly soluble in warm aqueous alkali and partially so in 2-butanone, dioxane, ether, isopropanol and chlorohydrocarbons. It dissolved only slightly in benzene and was insoluble in water and low molecular aliphatic hydrocarbons. From solution or melt, it could be cast into brittle films. Chromatography on alumina result in the isolation of the dinuclear compound [(V) with R′=4-carboxyphenyl, R″=H, and $n=1$], orange-yellow crystals, infusible up to 300° C.

*Analysis.*—calculated: C, 66.70; H, 4.80; Fe, 22.15. Found: C, 66.72; H, 4.99; Fe, 22.08; $M_n$, 510 (pyridine).

The residue remaining from acetic acid extraction of the crude polymer was exhaustively extracted with a total of 200 ml. of a 80:20 (by volume) mixture of pyridine and glacial acetic acid. The extract, after filtering from 1.22 g. of grayish-brown insoluble residue, was acidified with hydrochloric acid to pH~5 and was poured with stirring into 450 ml. of weakly acidified water (pH 5–6), containing 0.15 g. of $NaHSO_3$. In this manner, a higher-molecular polymer portion was precipitated, which, upon washing and drying in the manner described for the second fraction, was collected as a dark brown powdery solid weighing 3.50 g. (14.5% yield); it was termed "1st fraction". The analytical data are presented in line No. 3 of Table I. The fraction was infusible up to 300° C. and showed solubility in pyridine, dimethylformamide and dimethylsulfoxide.

EXAMPLE 3

(Polycondensation of ferrocene and p-cyanobenzaldehyde; preparation of polymer (V), with R″ being H and R′ being 4-cyanophenyl)

The well-ground mixture of 11.42 g. (0.0614 mole) of ferrocene, 4.47 g. (0.0341 mole) of p-cyanobenzaldehyde and 0.38 g. of anhydrous zinc chloride was placed in a vessel. Under a steady stream of dry nitrogen, the mixture was heated with stirring for 12 hours at 150° C. At the point of termination, the melt had become so highly viscous as to prevent further stirring, but was still soluble in dimethylformamide.

The cold, solidified melt was thoroughly extracted with water in the usual manner and, after drying for 24 hours at 50° C. in vacuo, was taken up in 150 ml. of warm dimethylformamide. The solution was filtered under a nitrogen blanket from 0.12 g. of a dark-brown, fluffy, insoluble solid consisting of polymer and catalyst residues, and was poured with stirring into 500 ml. of isopropanol. The brown precipitate formed, 3.99 g., was separated by filtration and was digested for two minutes with 0.5 N HCl (in the presence of 0.1 g. of $SnCl_2$) to remove coordinated solvent. The solid, after washing with water to neutrality and absence of chloride ion, was dried for 10 days at 50° C. in vacuo.

The yield was 3.85 g. (34.7%). This polymer portion, a brown, fine-powdery, infusible solid, was termed "1st fraction." $M_n$ and analytical data are given in line 5 of Table I. The fraction showed solubility in dimethylformamide, pyridine, dibromomethane and cyclohexanone; it was partially soluble in chloroform and dioxane, slightly soluble in benzene and insoluble in water, aliphatic alcohols and hydrocarbons.

From the mother-liquor, a second, lower-polymer portion was precipitated by the addition of 2 l. of water. The dark-yellow, fine-powdery solid was collected by filtration. After washing with 0.5 N HCl and water and drying for two days at 50° C. in vacuo, it weighed 9.23 g. From this polymer portion, 4.41 g. of ferrocene was separated by sublimation in the previously described manner (see Example 1). The residual, orange-brown solid, 4.80 g. (35.9% yield) was designated "2nd fraction." $M_n$ values and analytical results are listed in the last line of Table I. Melting range, 70–85° C. Because of its lower molecular weight, this fraction showed improved solubility behavior as compared to the first fraction. Thus, it dissolved not only in pyridine, dimethylformamide, dibromomethane and cyclohexanone, but also in dioxane and chlorohydrocarbons. Also, solubility in benzene was enhanced.

By extraction of the 2nd fraction with benzene and chromatographing the extraction on alumina, the di- and tri-nuclear oligomers were isolated.

EXAMPLE 4

(Polycondensation of ferrocene and p-hydroxybenzaldehyde; preparation of polymer (V), with R″ being H and R′ 4-hydroxyphenyl)

The mixture of 12.20 g. (0.10 mole) of p-hydroxybenzaldehyde, 27.90 g. (0.15 mole) of ferrocene and 2.79 g. of anhydrous zinc chloride was well ground and was placed into a vessel. The mixture was heated under nitrogen for 1.3 hours at 135° C. The reaction product was chilled with Dry Ice, ground and extracted with warm water. The dried, powdery residue was dissolved in 600 ml. of peroxide-free dioxane. The filtered solution was poured into 1600 ml. of water to precipitate the polymer. This precipitation was facilitated by briefly shaking the mixture after adding a few ml. of concentrated hydrochloric acid. The precipitate was removed by filtration, thoroughly washed with water, dried in vacuo over $P_2O_5$ and eventually freed from admixed ferrocene by extraction using pentane as extractant. The residual polymer, a blackish-green powder, was obtained in 78.1% yield (13.15 g).

*Analysis.*—Calculated for (V), with R″=H and R′=4-hydroxyphenyl (M, 1347): C, 69.57; H, 4.94; Fe, 20.74; OH, 5.1. Found: C, 68.94; H, 4.96; Fe, 19.87; OH, 5.6; $M_n$ (pyridine), 1238.

By chromatography on alumina of the cyclohexane-soluble portion of this product, the dinuclear oligomer [(V), with R″=H and R′=4-hydroxyphenyl and $n$=1] was isolated; yellow-green crystals, M.P. 182–186° C.

*Analysis.*—Calculated: C, 68.10; H, 5.08; Fe, 23.46; OH, 3.57. Found: C, 67.92; H, 5.11; Fe, 23.50; OH, 4.0; $M_n$, 475 (pyridine).

Polymers of similar composition were obtained in the same yield range by reducing the catalyst concentration and increasing the heating times correspondingly. Other runs were conducted varying the molar reactant ratio. No substantial changes in composition were found with ferrocene/aldehyde molar ratios ranging from 1.0 to 3.0.

EXAMPLE 5

(Polycondensation of ferrocene and o-methoxybenzaldehyde; formation of polymer (V), with R″ being H and R′ 2-methoxyphenyl)

The mixture of 13.60 g. (0.1 mole) of o-methoxybenzaldehyde, 27.90 g. (0.15 mole) of ferrocene and 2.79 g. of anhydrous zinc chloride was treated as in Example 1, employing a temperature of 130° C. and a total heating time of 3 hours. The mass was worked up as described in Example 1, giving 18.70 g. (53.31% yield) of a 1st fraction (90:10 isopropanol-water as precipitant), melting range 120–135° C.

*Analysis.*—Calculated for (V), with R″=H and R′=2-methoxyphenyl (M, 1403): C, 70.21; H, 5.32; Fe, 19.91. Found: C, 70.86; H, 5.37; Fe, 19.66; $M_n$, 1422 (benzene).

The 2nd fraction, collected in 18.1% yield (after ferrocene removal by vacuum sublimation), contained oligomers.

*Analysis.*—Calculated for (V), with R″=H and R′=o-methoxyphenyl, $n$=2 (M, 794): C, 69.55; H, 5.33; Fe, 21.09. Found: C, 69.20; H, 5.36; Fe, 22.01; $M_n$ 710.

From this fraction, by chromatography on alumina, using cyclohexane as solvent, the dinuclear oligomer [(V), with R″=H and R′=o-methoxyphenyl and $n$=1] was isolated; orange crystals, M.P. 172–174° C.

*Analysis.*—Calculated: C, 68.60; H, 5.35; Fe, 22.79. Found: C, 68.51; H, 5.43; Fe, 22.46; $M_n$, 480 (benzene).

In other runs, the catalyst concentrations were reduced as far down as 3% (by weight of ferrocene). With heating times extended correspondingly, no essential changes in composition and yield were observed. If the ferrocene concentrations were reduced (e.g., ferrocene/aldehyde molar ratio 1:1), polymers of similar composition, but containing slightly less iron (e.g., Fe found: 18:12%), were isolated.

EXAMPLE 6

(Polycondensation of ferrocene and crotonaldehyde; formation of polymer (V), with R″ being H and R′ propenyl)

The mixture of 2.80 g. (0.04 mole) of crotonaldehyde, 7.44 g. (0.04 mole) of ferrocene, 0.74 g. of anhydrous zinc chloride and 0.04 g. of p-benzoquinone (polymerization inhibitor) was sealed in a container under dry nitrogen. The container was heated for 3.5 hours at 120° C. Work-up as in Example 1, using 80% aqueous isopropanol as the first precipitant, gave 1.91 g. (21.0% yield) of a light-tan powdery solid constituting the 1st fraction. Melting range, 90–115° C.

*Analysis.*—Calculated for (V), with R″=H and R′=—CH=CH—CH₃ (M, 1138): C, 69.63; H, 5.84; Fe, 24.53. Found: C, 70.36; H, 6.14; Fe, 20.76; $M_n$, 1180 (benzene).

The fraction was readily soluble in benzene, chloroform and 2-butanone; it was insoluble in water and nearly so in isopropanol. From the mother-liquor, the 2nd fraction was precipitated by excess water; after removal of ferrocene by vacuum sublimation, it weighed 1.10 g. (17.5% yield); melting range, 85–125° C.; $M_n$, 650 (benzene).

EXAMPLE 7

(Co-condensation of ferrocene, p-carboxybenzaldehyde and p-cyanobenzaldehyde; formation of polymer (V), with R″ being H and R′ 4-carboxyphenyl and 4-cyanophenyl)

The mixture of 2.62 g. (0.020 mole) of p-cyanobenzaldehyde, 3.00 g. (0.020 mole) of p-carboxybenzaldehyde, 8.93 g. (0.048 mole) of ferrocene and 0.89 g. of anhydrous zinc chloride was heated for 40 minutes at 135° C., using the equipment and technique described in Example 1. The product of condensation was washed with water, dried and dissolved in 100 ml. of pyridine. From the filtered solution, the polymer was precipitated as 1st fraction by stirring the solution into 100 ml. of isopropanol. The solid was separated by filtration and was dried for 10 days in a high vacuum over $P_2O_5$ to give 5.4 g. (39.1% yield) of polymer, infusible up to 300° C.

*Analysis.*—Calculated for (V), with R″=H and R′=4-carboxyphenyl and 4-cyanophenyl, both radicals being present in the molecule in equal numbers (M, 2655): C, 69.66; H, 4.48; Fe, 18.93; N, 2.11; COOH, 6.78. Found: C, 68.31; H, 4.38; Fe, 18.71; N, 2.77; COOH, 6.39; $M_n$, 2700 (pyridine).

From the mother-liquor, the 2nd fraction containing oligomers and unreacted ferrocene was precipitated by excess water. Work-up as in Example 3 yielded, after ferrocene removal, 4.00 g. (24.9% yield) of oligomer as as a yellow powder, infusible up to 300° C.

*Analysis.*—Calculated for (V), with R″=H and R′=4-cyanophenyl and 4-carboxyphenyl (one unit each per molecule) (M, 803): C, 68.77; H, 4.64; Fe, 20.86; N, 1.74; COOH, 5.60. Found: C, 68.39; H, 4.53; Fe, 20.20; N, 2.18; COOH, 4.85; $M_n$, 880 (pyridine).

EXAMPLE 8

(Polycondensation of ferrocene and p-methoxyacetophenone; formation of polymer (V) with R″=methyl; R′=p-methoxyphenyl)

The mixture of 6.20 g. (0.033 mole) of ferrocene, 5.00 g. (0.033 mole) of p-methoxyacetophenone and 0.25 g. of anhydrous aluminum chloride was heated for two hours at 110° C. under nitrogen as described in Example 1. After the addition of 0.2 g. of aluminum chloride to the liquid melt, the bath temperature was raised to 130° C., and there maintained for another 3 hours. The product, after water washing and drying, was extracted with boiling benzene. Precipitation by isopropanol yielded a tan-brown polymer fraction infusible to 300° C. By evaporation to dryness of the mother-liquor and removal of admixed starting materials by chromatography on alumina, a second portion of products, essentially oligomeric, was collected (M.P. 95–100° C.), bringing the total yield to 1.87 g. (16.0%). The two fractions with $M_n$ 1990 and 1090, respectively, analyzed as follows (second fraction in parentheses): C, 73.53 (72.44); H, 6.42 (6.02); Fe, 14.21 (15.76). The solubility properties were found to be similar to those for the polymer described in Example 6.

The curing or crosslinking of the polymers obtained in the preceding examples is exemplified by the following procedures.

EXAMPLE 9

(Curing of polymer of Example 2 with a diepoxide)

A typical sample, 1.60 g. of polymer obtained in Example 2 and exhibiting $M_n$ 950, was well ground together at 60° C. with 2.25 g. of resorcinol diglycidyl ether as available commercially (e.g. the product Kopoxite 159 produced by Koppers Company, Inc., Pittsburgh, Pa.). The sticky resinous mass was cured under a blanket of dry nitrogen by heating for 4.5 hours at 100° C., followed by a post-curing cycle of 2 hours at 150° C. and 2 hours at 200° C. The crosslinked product was a tough, hard, resin that could be drilled, polished and machined.

EXAMPLE 10

(Curing of polymer of Example 4 with a diepoxide)

A characteristic sample, 2.0 g., of a polymer obtained in Example 4 ($M_n$, 1150), was intimately mixed at 50° C. with 3.0 g. of diepoxide essentially consisting of the diglycidyl ether of Bisphenol A, which is 2,2-bis(4-hydroxyphenyl) propane. Such diepoxide is available commercially, e.g., under the trade name GenEpoxy 175 and marketed by General Mills. The mixture was cured under a blanket of dry nitrogen for eight hours at 80° C., followed by post-curing for eight hours at 130° C., and two hours at 200° C. The product was a hard, glossy resin which could be drilled, machined and polished.

EXAMPLE 11

A crosslinked resin exhibiting properties similar to those of Example 10 was obtained by mixing 3.0 g. of the polymer obtained in Example 4 ($M_n$, 1150) with 1.9 g. of Kopoxite 159 (see Example 9), and curing this mixture for five hours at 90° C., followed by post-curing for four hours at 130° C., and 2.5 hours at 200° C.

EXAMPLE 12

By reacting ferrocene and furfural in a molar ratio of 1 to 1.5 at 130° C. for 4.2 hours in the presence of 15% zinc chloride, essentially in accordance with the procedure of Example 1, in addition to the soluble polymer (analysis found for first fraction: C, 67.5; H, 4.8; Fe, 17.9; $M_n$, 2280), crosslinked product in a yield of 23.8% was obtained. Such crosslinked product is in the form of a 2 furyl-containing polymer crosslinked by furfuryl bridges (analysis found: C, 68.0; H, 4.4; Fe, 14.6).

Extended heating of the reaction mixture beyond the 4.2 hours stated above resulted in a further increase in the amount of such crosslinked polymer.

The preparation of films from solutions of the polymers of the present invention is illustrated by the examples below.

EXAMPLE 13

A sample of the polymer obtained in Example 1 (fraction 1 of Table I) was dissolved in cyclohexanone so as to give a 5% solution (by weight). This solution was sprayed onto 1-inch diameter quartz windows using a spray gun, with air stream pressurized to 45 p.s.i. In this manner, a thin, transparent film was cast on the window, with thickness ranging from 0.0002 to 0.005 inch, depending on the number and mode of applications. The film was dried for 24 hours at 50° C. in vacuo. Placed between quartz windows or other suitable composite strata, the film can be used as ultraviolet absorbing component in multi-layer transparent window systems.

Films formed from other polymers of the present invention can be prepared in a similar manner using the above-described spray-coating technique. Other suitable techniques resulting in film formation include casting from solutions or from melts. The latter procedure is limited to such polymer fractions that are low enough in molecular weight to give a defined melting range below 100–200° C. Typical examples of polymers that lend themselves particularly well to this technique are the second fractions of Examples 1 and 3, listed in lines 2 and 6 of Table I, as well as the polymers of Examples 5 and 6.

The following are additional examples of the preparation of polymers according to the invention.

EXAMPLE 14

The procedure of Example 6 is generally followed except that the crotonaldehyde is replaced by the same molar proportion of chloral.

A polymeric product (V) is obtained wherein R″ is hydrogen and R′ is —CCl$_3$, and having a $M_n$ value of about 1200.

EXAMPLE 15

The procedure of Example 5 is generally followed except that the o-methoxybenzaldehyde is replaced by the same molar proportion of p-dimethylaminobenzaldehyde.

A polymeric product (V) is obtained wherein R″ is hydrogen and R′ is 4-dimethylaminophenyl, and having a $M_n$ value of about 1900.

From the foregoing, it is seen that the invention provides a novel class of particularly versatile ferrocene polymers containing functional groups or functional positions, such polymers being useful per se, e.g., as film-forming materials and being particularly valuable as prepolymers or intermediates for reaction with crosslinking agents to provide a broad range of cured polymers having a variety of applications.

I am aware of U.S. Patent 2,709,175, which describes products produced by reaction of ferrocene (dicyclopentadienyl-iron) with aldehydes such as formaldehyde and benzaldehyde. However, such reaction is carried out in an acetic acid medium and in the presence of a mineral acid or a strong organic acid as catalyst. By this procedure, the reaction products produced have entirely different properties, both physical and chemical, from the polymeric products of the present invention, which are produced by reaction in the melt phase and in the absence of any diluent, and in the presence of Lewis acids such as zinc chloride as catalyst, as previously noted. There is no indication in the patent that the products produced therein are polymeric. That the patent products are not polymeric is evidenced by the disclosure in the patent that the products produced therein are purified by crystallization from solvents such as n-heptane, whereas the polymeric products of the invention cannot be so recrystallized, but only reprecipitated. The only example of a molecular weight value given in the patent is evidence of the monomeric character of the patent products.

While I have described particular embodiments of my invention for the purpose of illustration, it should be understood that various modifications and adaptations thereof may be made within the spirit of the invention, as set forth in the appended claims.

I claim:

1. A polymeric product consisting essentially of polymers having the formula

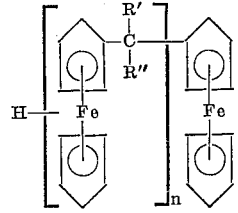

where R′ is an organic radical selected from the group consisting of aliphatic, cycloaliphatic, aromatic and heterocyclic radicals, said radical comprising a reactive group selected from the class consisting of carboxyl, hydroxyl, cyano, alkoxy, amino, halogen, and olefinically unsaturated groups, R″ is a member selected from the group consisting of hydrogen and an organic radical selected from the group consisting of aliphatic, cycloaliphatic, aromatic and heterocyclic groups and $n$ is a positive integer greater than 1.

2. A polymeric product as defined in claim 1, where $n$ is a positive integer of from 2 to about 50.

3. A polymeric product consisting essentially of polymers having the formula

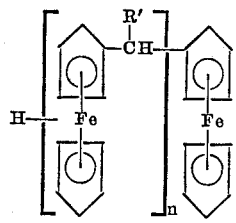

where R' is an organic radical selected from the group consisting of aliphatic, cycloaliphatic, aromatic and heterocyclic radicals, said radical containing a reactive group selected from the class consisting of carboxyl, hydroxyl, cyano, alkoxy, amino, halogen, and olefinically unsaturated groups and $n$ is a positive integer greater than 1.

4. A polymeric product as defined in claim 3, wherein $n$ is a positive integer of from about 4 to about 40.

5. A polymeric product comprising polymers consisting essentially of recurring units of the formula

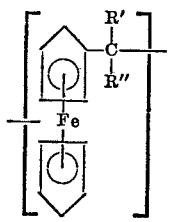

where R' is an organic radical selected from the group consisting of aliphatic, cycloaliphatic, aromatic and heterocyclic radicals, said radical comprising a reactive group selected from the class consisting of carboxyl, hydroxyl, cyano, alkoxy, amino, halogen, and olefinically unsaturated groups, and R" is a member selected from the group consisting of hydrogen and an organic radical selected from the group consisting of aliphatic, cycloaliphatic, aromatic and heterocyclic groups.

6. A polymeric product as defined in claim 1, wherein said first mentioned organic radical is aryl and said reactive group is hydroxy.

7. A polymeric product as defined in claim 1, wherein said first mentioned organic radical is aryl and said reactive group is methoxy.

8. A polymeric product as defined in claim 3, wherein said organic radical is aryl and said reactive group is carboxy.

9. A polymeric product as defined in claim 3, wherein said organic radical is aryl and said reactive group is cyano.

10. A polymeric product as defined in claim 3, wherein R', is alkenyl.

11. A polymeric product as defined in claim 3 wherein R' is furyl.

12. A polymeric product as defined in claim 3 wherein R' is hydroxyphenyl.

13. A polymeric product as defined in claim 3 wherein R' is methoxyphenyl.

14. A polymeric product as defined in claim 3 wherein R' is propenyl.

15. A polymeric product as defined in claim 1, wherein R' is methoxyphenyl and R" is methyl.

References Cited

UNITED STATES PATENTS 2,709,175   5/1955   Graham _____ 260—439

WILLIAM H. SHORT, *Primary Examiner.*

M. GOLDSTEIN, *Assistant Examiner.*

U.S. Cl. X.R.

161—198; 260—2, 45.75, 63, 67, 78, 88.1, 439, 824, 838